United States Patent Office 3,808,230
Patented Apr. 30, 1974

3,808,230
2-OXY-4-PHTHALOYLAMIDO-5-HALOBENZOATE
COMPOUNDS
Ctirad Podesva, Montreal, Quebec, Geza Kohan, La Salle, Quebec, and William T. Scott, Ville-de-Lery, Quebec, Canada, assignors to Delmar Chemicals Limited, Ville La Salle, Quebec, Canada
No Drawing. Continuation-in-part of abandoned application Ser. No. 4,587, Jan. 21, 1960. This application Nov. 11, 1971, Ser. No. 197,985
Int. Cl. C07d 27/52
U.S. Cl. 260—326 A     7 Claims

ABSTRACT OF THE DISCLOSURE

This invention provides novel phthaloylamido compounds of the following general formula:

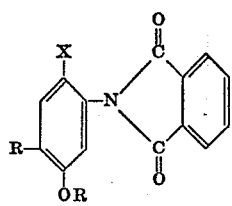

wherein X represents a chlorine or bromine atom, B represents a free or esterified carboxylic acid group and R represents a hydrogen atom or an alkyl group, and processes for making them. Such compounds are useful in making certain specific 4-amino-5-halo - 2 - substituted benzamides, which are known compounds, say, N-(2-diethylaminoethyl)-2-methoxy - 4 - amino - 5 - chlorobenzamide, of value in chemotherapy, for instance, as an antiemetic. Additionally, these compounds are pharmacologically active in that they exhibit central nervous system depressant effects so the invention also provides pharmaceutical compositions containing one or more of these compounds as the active ingredient.

RELATED APPLICATION

This application is a continuation-in-part application of U.S. application Ser. No. 4,587, filed on Jan. 21, 1960, now abandoned.

BACKGROUND OF THE INVENTION

This invention relates to novel phthaloylamido compounds, to processes for making them and to pharmaceutical compositions containing them. More particularly, this invention is concerned with novel phthaloylamido compounds of the following general formula:

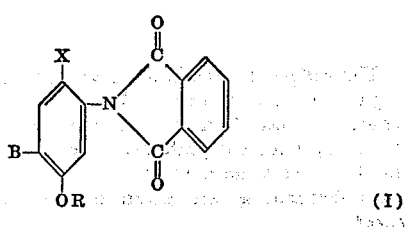

wherein X represents a chlorine or bromine atom, B represents a free or esterified carboxylic acid group and R represents a hydrogen atom or an alkyl group, to processes for making them, and pharmaceutical compositions containing them.

As described in the specification of our copending patent applications Ser. Nos. 197,986 and 197,987 filed concurrently herewith, such phthaloylamido compounds of the foregoing general Formula I are useful in making benzamide compounds of the following general formula:

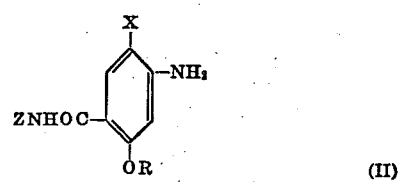

wherein X represents a chlorine or bromine atom, R represents a hydrogen atom or an alkyl group and Z represents a tertiary aminoalkyl group. Processes for making such benzamide compounds utilizing the phthaloylamido compounds of the general Formula I are described and claimed in the aforementioned patent specifications. Benzamide compounds of the general Formula II are known to be pharmacological active and some of them, especially N-(2-diethylaminoethyl)-2-methoxy-4-amino-5-chlorobenzamide, are useful in chemotherapy, broadly as regulators of the digestive system, and more specifically as antiemetics that may be used in the treatment of emesis associated with various conditions, such as motion or seasickness or sickness due to pregnancy. In this role, the benzamide compounds or non-toxic salts thereof are associated in pharmaceutical compositions with pharmaceutically acceptable organic or inorganic, solid or liquid carriers.

STATEMENTS OF INVENTION

According to this invention in a composition of matter aspect there are provided novel phthaloylamido compounds of the following general formula:

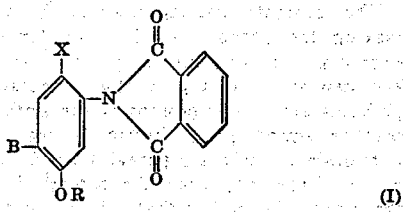

Preferred phthaloylamido compounds are those in which X represents a chlorine atom, and each of R and $R_1$, which may be the same or different, represents a lower alkyl group such, for example, as methyl, ethyl, propyl or isopropyl.

Some of the phthaloylamido compounds of the general Formula I, for instance, those in which R represents hydrogen may be used as the starting material in preparing other phthaloylamido compounds of the same general formula. In this sense, the conversion of one phthaloylamido compound into another of the same general formula may represent an individual reaction step in a multi-stage process for making the benzamide compounds of the general Formula II. Those phthaloylamido compounds of the following general formula:

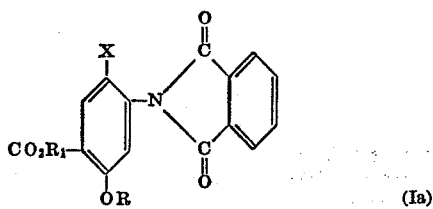

(Ia)

wherein X and R have the same significance as previously and $R_1$ represents an alkyl group are immediate precursors for the benzamide compounds in that, as disclosed in the aforementioned patent specifications, they may be converted into them by a single-stage or two-stage dephthaloylation/aminolysis procedure.

The phthaloylamido compounds of this invention are not only useful as intermediates in the synthesis of the benzamide compounds for they manifest interesting biological properties in their own right in that they exhibit central nervous system depressant activity and some analgesic activity suggesting potential utility in chemotherapy as psychotropic and/or analgesic agents.

According to this invention in its process aspect, the phthaloylamido compounds of the foregoing general Formula I are prepared by chlorinating or brominating a compound of the following general formula:

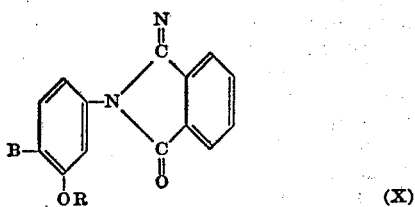

(X)

wherein B and R have the same significance as previously whereby a chlorine or bromine atom is introduced at the 5-position. Advantageously, in the compound of Formula III, B represents an esterified carboxylic acid and R represents an alkyl group. As used herein in the context of alkyl the term "lower" connotes alkyl groups containing from 1 to 6 carbon atoms inclusive, and the term "known" as applied to methods of effecting various reaction steps refers to methods in actual use and/or described in the literature on the subject.

DETAILED DESCRIPTION OF THE INVENTION

The ultimate starting material in the processes for making the phthaloylamido compounds of the general Formula I is conveniently p-aminosalicylic acid and, a key step at some stage in the preparation of particular phthaloylamido compounds is the phthaloylation of the reactive amino group therein by reaction with phthalic anhydride to yield a p-phthaloylamidosalicylic acid compound. Depending upon the nature of the compound of the general Formula I that is being synthesized, the processes will usually involve the following sequence of reactions steps:

(i) esterification of the carboxylic acid function;
(ii) alkylation of the phenolic hydroxyl function; and
(iii) halogenation with the introduction of a chlorine or bromine atom as the case may be at the 5-position in the benzene ring.

The different steps that may be employed in preparing the phthaloylamido compounds of the general Formula I, and the integration of the individual reaction steps in a multi-stage process for making benzamide compounds of the general Formula II is illustrated in the following flow sheet.

FLOW SHEET I

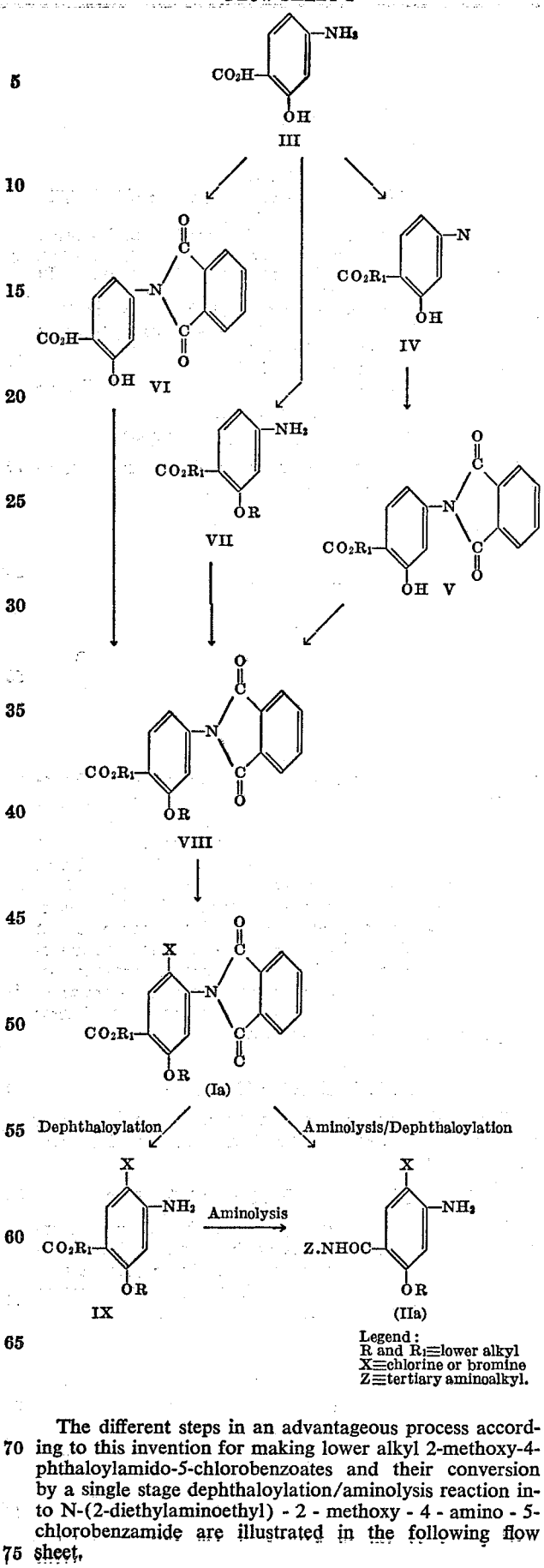

Legend:
R and $R_1$ = lower alkyl
X = chlorine or bromine
Z = tertiary aminoalkyl.

The different steps in an advantageous process according to this invention for making lower alkyl 2-methoxy-4-phthaloylamido-5-chlorobenzoates and their conversion by a single stage dephthaloylation/aminolysis reaction into N-(2-diethylaminoethyl) - 2 - methoxy - 4 - amino - 5 - chlorobenzamide are illustrated in the following flow sheet.

FLOW SHEET II

STEP 1

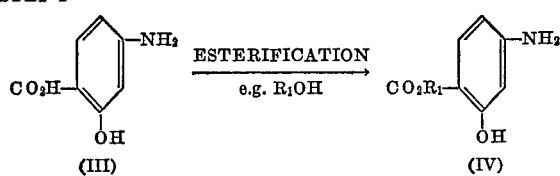

STEP 2

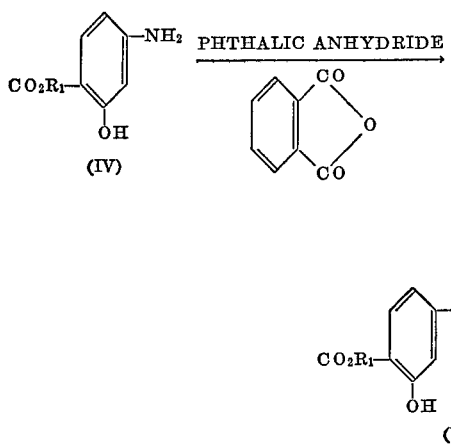

STEP 3

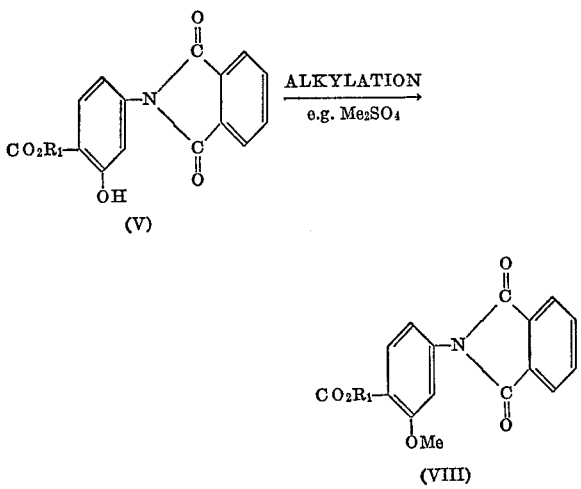

STEP 4

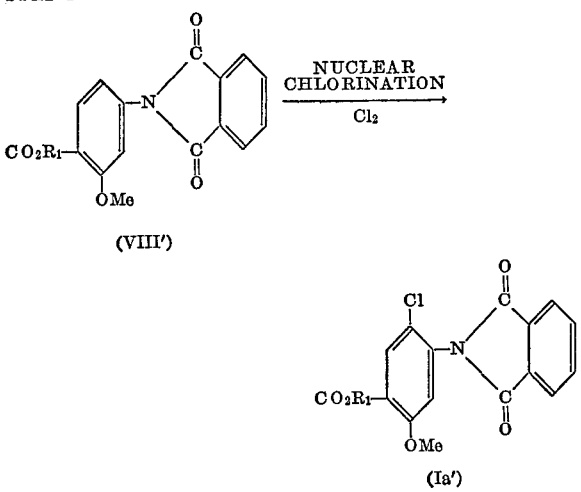

STEP 5

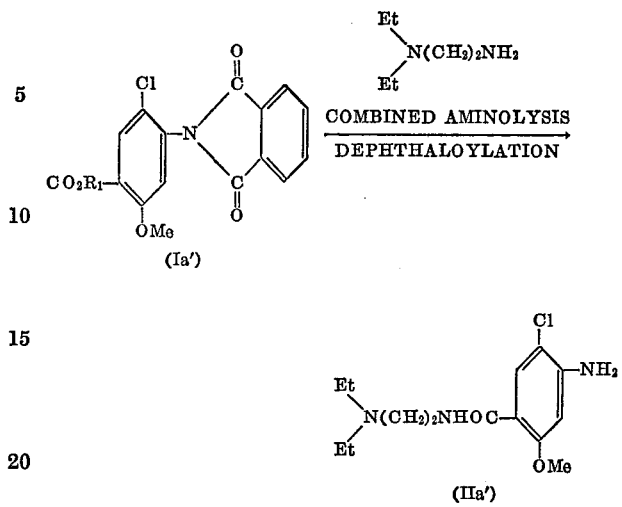

Legend: $R_1$ = lower alkyl.

The individual process steps that may be involved in making the different phthaloylamido compounds as illustrated in the foregoing flow sheets will now be further described.

The ultimate starting compound for making the phthaloylamido compounds is p-aminosalicylic acid, which is readily available commercially in the form of a white crystalline powder. This compound contains three functional groups, namely a carboxyl group, a hydroxyl group and an amino group, all of which may be involved as reaction centers at some stage in the processes according to this invention. Thus, the carboxyl group may be esterified, the hydroxyl group alkylated and the amino group phthaloylated, though not necessarily in that order.

Esterification is effected by any convenient known esterification method, such, for example, as by heating the p-aminosalicylic acid with an excess of a lower alkanol, say, methanol, ethanol or isopropanol in the presence of a mineral acid, such as concentrated sulfuric acid, as catalyst. The methyl ester formed, for example, by heating the p-amino-salicylic acid with excess methanol in the presence of concentrated sulfuric acid, is the preferred ester since this is generally associated with the smoothest reaction and best yields in subsequent process steps. However, other esters such, for example, as ethyl, propyl, isopropyl and butyl may be formed, for instance, by reaction of the acid with the corresponding lower alkanol, in this reaction step.

Alkylation of the phenolic hydroxyl group is accomplished by any convenient known alkylation method such for example, as by a Williamson's synthesis using an alkyl halide, conveniently a lower alkyl halide, or by reaction with an alkyl or dialkyl sulfate, conveniently a lower alkyl or dialkyl sulfate, an alkyl benzene, conveniently a lower alkyl benzene, or an alkyl toluene sulfate, conveniently a lower alkyl toluene sulfonate.

Phthaloylation of the reactive amino group is accomplished by reaction of the ester with the readily available phthalic anhydride to obtain a p-phthaloylamidosalicylic acid ester. This reaction is conveniently effected by heating the reactants together in an organic solvent which is substantially inert to both reactants and in which both are at least partially soluble. Suitable organic solvents include, inter alia, high boiling aromatic solvents such, for example, as anhydrous toluene, or xylene. Advantageously, the reaction is conducted in the presence of a small amount of a basic condensation catalyst such, for example, as triethylamine.

Esterification of the carboxyl group and alkylation of the phenolic hydroxyl group may be accomplished in a single process step, conveniently, by reacting a p-phthaloyl-amidosalicylic acid compound with dimethylsulfate or similar alkylating agents under anhydrous and alkaline conditions. Advantageously, the reaction is carried out in an inert anhydrous organic solvent such, for example, as anhydrous acetone, methylethylketone or tetrahydrofuran in the presence of an alkali such, for example, as sodium hydroxide, potassium hydroxide, sodium carbonate or potassium carbonate. The reaction is conveniently conducted at around room temperature or above under anhydrous conditions. It is desirable to exclude water from the reaction medium, otherwise side reactions may occur.

Nuclear halogenation, say, of an alkyl-2-alkoxy-4-phthaloylamidobenzoate with the introduction of a chlorine or bromine atom as the case may be at the 5-position in the benzene ring may be accomplished by using any convenient known method of effecting such nuclear substitution. Conveniently, these 5-chloro- and 5-bromo- compounds are obtained by direct chlorination and bromination respectively, say, of an alkyl 2-alkoxy-4-phthaloyl-amidobenzoate in an inert solvent such as acetic acid, if desired, in the presence of a catalyst. Typically, the halogenation is effected at around room temperature or with slight cooling.

The following examples are provided by way of further illustrating, but not limiting, the invention. In these examples, the melting point data was obtained by the capillary tube procedure.

EXAMPLE 1

Methyl 2-methoxy-4-phthaloylamido-5-chlorobenzoate

PART A

Methyl p-aminosalicylate 330 mls. of absolute methanol were introduced into a 1 liter round-bottom flask fitted with a mechanical stirrer and a reflux condenser, and 136 gms. concentrated sulfuric acid (98%) were added in small portions while cooling the flask. Finally, 45.9 gms. (0.3 mole) of p-aminosalicylic acid were added, and the suspension so-obtained heated under reflux, with continuous stirring, for 5 hours. The solution was cooled to ambient temperature (25° C.) and then poured, with continued stirring, into a solution of 136.5 gms. of dry sodium carbonate in 1.3 liters of water. The methyl p-aminosalicylate so-formed precipitated out of solution and was separated by filtration, washed with water until disappearance of sulfate ions, then dried in a vacuum dessicator at 60° C. 44.2 gms. of the product were obtained as off-white crystals; melting point: 114° to 117° C.; yield 88%.

PART B

Methyl p-phthaloylamidosalicylate 33.4 gms. (0.2 mole) methyl p-aminosalicylate obtained by the procedure of Part A of this example, 29.6 gms. (0.2 mole) phthalic anhydride and 2.02 gms. triethylamine (as a basic condensation catalyst) were added to 400 ml. anhydrous toluene as solvent in a 1 liter round-bottom flask fitted with a mechanical stirrer and a reflux condenser with a water trap. The mixture was then refluxed for 3½ hours while stirring continuously. It was then cooled to 0° C. on an ice bath, when the desired methyl p-phthaloylamido salicylate precipitated out in the form of a crystalline solid. This solid was separated from the solution by filtration, suspended in 200 ml. methanol and the suspension stirred for 30 minutes at ambient temperature. Thereafter, the purified methyl-phthaloylamido salicylate was recovered by filtration and dried at 80° C. in a vacuum dessicator to give 49 gms. (yield: 83%) of the product in the form of white, needle-shaped crystals. An analysis sample was recrystallized from acetone.

Melting point: 215° to 217° C.

Elementary analysis for $C_{16}H_{11}NO_5$: Calculated (percent): C, 64.64; H, 3.73; N, 4.71. Found (percent): C, 64.75; H, 3.70; N, 4.56.

Infra-red.—The infra-red spectrum of the compound in a Nujol mull showed characteristic absorption peaks and bands at the following wavelengths:

$\gamma CO$(phthaloyl): 1788; 1770; 1710 cm.$^{-1}$
$\gamma CO$(ester): 1675 cm.$^{-1}$

PART C

Methyl 2-methoxy-4-phthaloylamidobenzoate 29.7 gms. (0.1 mole) methyl p-phthaloylamido salicylate obtained by the procedure of Part B of the foregoing example were added to 550 ml. anhydrous acetone in a 1 liter round-bottom flask fitted with a mechanical stirrer and a reflux condenser. 27.6 gms. (0.2 mole) powdered anhydrous potassium carbonate were added to the suspension followed by 13.86 gms. (0.11 mole) dimethyl sulfate, which was added slowly while continuously stirring. The mixture was refluxed for 20 hours. Thereafter, the bulk of the acetone was distilled off, and the residue, which was a thick paste, cooled to about 50° C. and diluted with 500 ml. water. The resultant suspension was stirred at ambient temperature for 30 minutes. The solid product, methyl 2-methoxy-4-phthaloylamidobenzoate, was separated by filtration, washed with water until neutral and then dried in a vacuum dessicator at 80° C. 30.1 gms. of the product, as white, needle-shaped crystals, were obtained (yield: 97%). An analysis sample was recrystallized from acetone.

Melting point: 151° to 153° C.

Elementary analysis for $C_{17}H_{13}NO_5$: Calculated (percent): C, 65.59; H, 4.50; N, 4.2. Found (percent): C, 65.38; H, 4.65; N, 4.07.

Infra-red.—The infra-red spectrum of the compound in a Nujol mull showed characteristic absorption peaks and bands at the following wavelengths:

$\gamma CO$(phthaloyl): 1775; 1750; 1720 cm.$^{-1}$
$\gamma CO$(ester): 1687 cm.$^{-1}$

PART D

Methyl 2-methoxy-4-phthaloylamido-5-chlorobenzoate 15.35 gms. (0.05 mole) methyl 2-methoxy-4-phthaloyl-amidobenzoate obtained by the procedure of the foregoing Example 2 and 250 ml. glacial acetic acid were introduced into a 1 liter round-bottom flask fitted with a mechanical stirrer, a thermometer and a dropping funnel. While the mixture was stirred continuously, there was added a solution comprising 3.9 gms. (0.055 mole) chlorine gas dissolved in 50 ml. glacial acetic acid. The mixture was stirred at ambient temperature for 1½ hours. Thereafter, the reaction mixture was poured into 1500 ml. of cold water. The resulting precipitate, methyl 2-methoxy-4-phthaloylamido-5-chlorobenzoate, was separated by filtration, and added to 500 ml. saturated aqueous sodium bicarbonate solution. The suspension was stirred for 30 minutes, after which the product was filtered off, washed with water until there was no trace of chloride ions, then dried at 60° C. in a vacuum dessicator. 16.6 gms. of the desired methyl 2-methoxy-4-phthaloyl-amido-5-chlorobenzoate were obtained (yield: 96%). An analysis sample was recrystallized from methanol.

Melting point: 119° to 120° C.

Elementary analysis for $C_{17}H_{12}ClNO_5$: Calculated (percent): C, 59.05; H, 3.50; Cl, 10.25; N, 4.05. Found (percent): C, 59.14; H, 3.41; Cl, 10.42; N, 426.

Infra-red.—The infra-red spectrum of the compound in a Nujol mull showed characteristic absorption peaks and bands at the following wavelengths:

$\gamma CO$: 1775, 1755, 1720 cm.$^{-1}$

EXAMPLE 2

Methyl 2-methoxy-4-phthaloylamido-5-chlorobenzoate

PART A

Para-phthaloylamidosalicyclic acid 30.6 gms. (0.2 mole) salicyclic acid, 29.6 gms. phthalic anhydride and 2.02 gms. triethylamine, as a basic condensation catalyst, were added to 400 ml. anhydrous toluene as solvent in a 1 liter round-bottom flask fitted with a mechanical stirrer, reflux condenser and a water trap. The mixture was refluxed for 3½ hours with continuous stirring. It was then cooled to 0° C. on an ice bath when the desired p-phthaloylamidosalicylic acid precipitated out in the form of a white crystalline solid. This solid was filtered off, suspended in 200 ml. of anhydrous methanol and stirred at 25° C. for 30 minutes. The purified product was filtered off and dried at 60° C. in an air oven, to give 43.3 gms. (yield 76.5%) of the product in the form of needle-shaped, white crystals. An analysis sample was recrystallized from acetone.

Melting point: 295° to 297° C.

Elementary analysis for $C_{15}H_9NO_5$: Calculated percent): C, 63.60; H, 3.18; N, 4.94. Found (percent): C, 63.34; H, 3.21; N, 4.95.

Infra-red spectrum.—The infra-red spectrum of the compound taken in a potassium bromide dispersion showed characteristic absorption bands and peaks at the following wavelengths:

$\gamma CO$(phthaloyl): 1780; 1765; 1730 cm.$^{-1}$
$\gamma CO$(acid): 1670 cm.$^{-1}$

PART B

Methyl 2-methoxy-4-phthaloylamidobenzoate

A mixture comprising 22.64 gms. (0.08 mole) p-phthaloylamidosalicylic acid, obtained by the procedure of the foregoing Example 4, 27.6 gms. (0.2 mole) powdered anhydrous potassium carbonate and 250 mls. anhydrous acetone as solvent was stirred for 30 minutes at 25° C. in 1 liter round-bottom flask, 22.16 gms. (0.176 mole) dimethyl sulfate were slowly added to the continuously stirred suspension. The resulting mixture was refluxed for 20 hours. The bulk of the acetone was then distilled off under reduced pressure, and the residue cooled to 25° C., after which 500 mls. of water were added thereto.

The solid product, methyl 2-methoxy-4-phthaloyl-amido-benzoate, was separated by filtration, washed with water until neutral and dried at 60° C. in an air oven, to give 24.7 gms. (yield: 97%) of the product in the form of a white powder. An analysis sample was recrystallized from acetone.

Melting point: 151° to 153° C.

Elementary analysis for $C_{17}H_{13}NO_5$: Calculated (percent): C, 65.59; H, 4.50; N, 4.20. Found (percent): C, 65.38; H, 4.61; N, 4.13.

Infra-red.—The infra-red spectrum of the compound taken in a potassium bromide dispersion showed characteristic absorption bands and peaks at the following wavelengths:

$\gamma CO$(phthaloyl): 1775; 1750; 1720 cm.$^{-1}$
$\gamma CO$(ester): 1687 cm.$^{-1}$

PART C

Methyl 2-methoxy-4-phthaloylamido-5-chlorobenzoate

This was prepared by a similar procedure to that set forth in Part D of Example 1 hereinbefore.

EXAMPLE 3

Ethyl 2-methoxy-4-phthaloylamido-5-chlorobenzoate

PART A

Ethyl p-aminosalicylic acid

The procedure of Part A of Example 1 was repeated exactly except that the absolute methanol, as the esterifying agent, was replaced by 260 mls. ethanol. 40 gms. of the desired ethyl p-aminosalicylic acid product were obtained in the form of off-white crystals (melting point: 109° to 111° C.; yield: 73%).

PART B

Ethyl p-phthaloylamidosalicylate

The procedure of Part B of Example 1 was repeated exactly except that the methyl ester reactant was replaced by 36.2 gms. (0.2 mole) of the ethyl ester obtained by the procedure of Part A of this example. 50 gms. of ethyl p-phthaloylamidosalicylate were obtained (yield: 81%) in the form of white, needle-shaped crystals. An analysis sample was recrystallized from benzene.

Melting point: 193° to 196° C.

Elementary analysis for $C_{17}H_{13}NO_5$: Calculated (percent): C, 65.59; H, 4.21; N, 4.50. Found (percent): C, 65.79; H, 4.41; N, 4.37.

PART C

Ethyl 2-methoxy-4-phthaloylamidobenzoate

The procedure of Part C of Example 1 was repeated exactly except that ethyl p-phthaloylamidosalicylate obtained by the procedure of Part B of this example in an amount of 31.13 gms. (0.1 mole), was used in place of the corresponding methyl compound. 31 gms. of the desired ethyl 2-methoxy-4-phthaloylamidobenzoate, as off-white crystals, were obtained (yield: 95%). An analysis sample was recrystallized from acetone.

Melting point: 115° to 118° C.

PART D

Ethyl 2-methoxy-4-phthaloylamido-5-chlorobenzoate

The procedure of Part D of Example 1 was repeated exactly except that the methyl compound was replaced by 16.25 gms. (0.05 mole) ethyl 2-methoxy-4-phthaloyl-amidobenzoate obtained by the procedure of Part A of this example. 17 gms. of the desired ethyl 2-methoxy-4-phthaloylamido-5-chlorobenzoate were obtained in the form of white, granular crystals (yield: 95%). An analysis sample was recrystallized from a benzene-hexane mixture.

Melting point: 120° to 122° C.

Elementary analysis for $C_{18}H_{14}ClNO_5$: Calculated (percent): C, 60.09; H, 3.92; Cl, 9.86; N, 3.89. Found (percent): C, 60.17; H, 4.05; Cl, 9.88; N, 3.78.

EXAMPLE 4

Isopropyl 2-methoxy-4-phthaloylamido-5-chlorobenzoate

PART A

Isopropyl p-aminosalicylic acid

The procedure of Part A of Example 1 was repeated exactly except that the absolute methanol, as the esterifying agent, was replaced by 320 mls. isopropanol. 28.5 gms. of the desired isopropyl p-aminosalicylic acid product were obtained in the form of off-white, granular crystals (melting point 72° to 74° C.; yield: 49%).

PART B

Isopropyl p-phthaloylamidosalicylate

The procedure of Part B of Example 1 was repeated exactly except that the methyl ester reactant was replaced by 39 gms. (0.2 mole) of the isopropyl ester obtained by the procedure of Part A of this example. 51 gms. of purified isopropyl p-phthaloylamidosalicylate were obtained (yield: 78%) in the form of white, needle-shaped crystals. An analysis sample was recrystallized from acetone.

Melting point: 139° to 142° C.

Elementary analysis for $C_{18}H_{15}NO_5$: Calculated (percent): C, 66.45; H, 4.65; N, 4.31. Found (percent): C, 66.21; H, 4.91; N, 4.54.

PART C

Isopropyl 2-methoxy-4-phthaloylamidobenzoate

The procedure of Part C of Example 1 was repeated exactly except that isopropyl p-phthaloylamidosalicylate obtained by the procedure of Part B of this example in an amount of 26 gms. (0.08 mole), was used in place of the corresponding methyl compound. 23.2 gms. of the desired isopropyl 2-methoxy-4-phthaloylamidobenzoate, as white crystals, were obtained (yield: 86%). An analysis sample was recrystallized from isopropanol.

Melting point: 100° to 102° C.

Elementary analysis for $C_{19}H_{17}NO_5$: Calculated (percent): C, 67.25; H, 5.05; N, 4.13. Found (percent): C, 67.51; H, 5.23; N, 4.01.

PART D

Isopropyl 2 - methoxy-4-phthaloylamido-5-chlorobenzoate

The procedure of Part D of Example 1 was repeated exactly except that the methyl compound was replaced by 16.96 gms. (0.05 mole) isopropyl 2-methoxy - 4 - phthaloylamidobenzoate obtained by the procedure of Part C of this example. 17.8 gms. of the desired isopropyl 2-methoxy - 4 - phthaloylamido 5 - chlorobenzoate were obtained in the form of white, granular crystals (yield: 95%). An analysis sample was recrystallized from a benzene-hexane mixture.

Melting point: 123° to 125° C.

Elementary analysis for $C_{19}H_{16}ClNO_5$: Calculated (percent): C, 61.05; H, 4.32; Cl, 9.49; N, 3.73. Found (percent): C, 61.21; H, 4.14; Cl, 9.65; N, 3.77.

As indicated hereinbefore, it has been found in accordance with this invention that the phthaloylamido compounds of the general Formula I have interesting biological properties in that such compounds when subjected to standard pharmacological evaluation exhibit central nervous system depressant activity. Additionally, such compounds have been found to possess analgesic activity.

Accordingly, this invention further provides in another of its aspects a pharmaceutical composition comprising as an essential active ingredient at least one active compound of the general Formula I in association with a pharmaceutically acceptable carrier therefor.

As indicated hereinbefore, it has been found in accordance with this invention that the phthaloylamido compounds of the general Formula I and salts thereof have interesting biological properties in that such compounds when subjected to standard pharmacological evaluation exhibit central nervous system depressant activity and also analgesic activity. Compounds acting in this way may be expected to be of use as psychotropic drugs and/or in treating certain symptoms of pain.

Accordingly, this invention further provides in another of its aspects a pharmaceutical composition comprising as an essential active ingredient at least one active compound of the general Formula I or a salt thereof in association with a pharmaceutically acceptable carrier therefor.

The compositions of the present invention are preferably administered either orally or rectally. Advantageously, the composition is in a dosage unit form appropriate to the desired mode of administration. For example, the dosage unit may be a tablet, capsule, pill, powder, packet, granule, wafer, elixir, suppository, or a measured quantity of a suspension, solution, a syrup of segregated multiples of the foregoing. The term "dosage unit form" as used in the specification and claims refers to physically discrete units suitable as unitary dosages for human subjects and animals, each unit containing a predetermined quantity of active material calculated to produce the desired therapeutic effect in admixture, or otherwise in association, with a pharmaceutical carrier therefor, the quantity of the active ingredient being such that one or more units are normally required for a single thereapeutic administration or that, in the case of severable units such as scored tablets, at least one fraction such as a half or a quarter of a severable unit is required for a single thereapeutic administration.

Advantageously, the compositions of this invention contain the active ingredient in an amount of at least 0.5% and not more than 95% by weight based on the total wight of the composition. Conveniently, the compositions of the invention when in dosage unit form contain 0.5 mg. to 1000 mg., and more conveniently from 5 mg. to 250 mg., of the active ingredient of Formula I.

The compositions of the present invention will normally consist of at least one compound of Formula I, typically in the form of an acid addition, say, hydrochloride or maleate salt thereof admixed with a carrier, or diluted by a carrier, or enclosed or encapsulated by a carrier in the form of a capsule, sachet, catchet, paper or other container. A carrier which serves as a vehicle, excipient or diluent medium for the therapeutically active ingredient may be a solid, semi-solid or a sterile liquid.

Some examples of the carriers which may be employed in the pharmaceutical compositions of the invention are lactose, dextrose, sorbitol, mannitol, starches such as wheat, corn, or potatoe starch, gum acaci, calcium phosphate, liquid paraffin, cocoa butter, oil of theobroma, alginates, tragacanth, gelatin, syrup B.P., methyl cellulose, polyoxyethylene sorbitan monolaurate, methyl and propyl hydroxybenzoates, pyrogen-free water and substantially isotonic saline solution. The choice of carrier is determined by the preferred form of administration, the solubility of the compound and standard pharmaceutical practice. In the case of tablets a lubricant may be incorporated to prevent sticking and binding of the powdered ingredients in the dies and on the punch of the tabletting machine. For such purpose, there may be employed, for example, talc, aluminum, magnesium or calcium stearates or polyethylene glycols (Carbowaxes) of suitable molecular weight.

The pharmaceutical compositions of this invention may contain, in addition to the active ingredient of the general Formula I, one or more other pharmacologically active ingredients which elicit desirable complementary effects.

Two examples of suitable pharmaceutical compositions according to this invention are presented below for the purpose of facilitating a better understanding of this aspect of the invention.

EXAMPLE A

Tablets were made by the procedure described below from a mixture of the following ingredients:

Formulation:

| Ingredient: | Content (gms.) |
|---|---|
| Methyl 2 - methoxy-4-phthaloylamido-5-chlorobenzoate | 1000 |
| Starch | 90 |
| Talc | 5 |
| Magnesium stearate | 5 |

Procedure.—The methyl 2 - methoxy - 4 - phthaloylamido - 5 - chlorobenzoate was mixed with 45 gms. of the starch and compressed into slugs. These slugs were reduced to granules by passage through a sieve of aperture size 420μ, the granules were mixed with the remainder of the starch, and the talc and the magnesium stearate were then added. The resultant mixture was compressed into various tablets weighing respectively (a) 55 mg., (b) 137.5 mg., and (c) 275 mg. to provide tablets containing respectively 50, 125 and 250 mg. of the active ingredient, 1-benzyl - 3 - (3-aminopropoxy)-1H-indazole hydrochloride.

EXAMPLE B

Capsules were made by the procedure described below from a mixture of the following ingredients:

Formulation:

| Ingredient: | Content (gms.) |
|---|---|
| Methyl 2 - methoxy - 4 - phthaloylamido- 5 - chlorobenzoate | 100 |
| Calcium phosphate | 20 |

Procedure.—The two powdered ingredients were thoroughly mixed together and filled into hard gelatin capsules so that each capsule contained 50 mg. of the active ingredient, 1-benzyl - 3 - (3-benzylaminopropoxy)-1H-indazole hydrochloride.

In the foregoing Examples A and B, the active ingredient specified may be wholly or partly replaced by another pharmacologically active compound of the invention.

The effectiveness and toxicity of typical compounds of this invention were determined by standard pharmacological tests. Thus, the analgesic activity was confirmed and evaluated by means of the acetylcholine induced writhing test in mice following basically the procedure of Siegmund et al. Proc. Soc. Exp. Biol., N.Y. 95:729, 1957 except that acetylcholine replaced phenylquinone as the antagonist, and/or utilizing pain electrosimulation on the tail of mice by the mouse tail clip test following basically the procedure of Bianchi and David J. Pharm. Pharmocology 1.12:449, 1960. The central nervous system activity was confirmed and evaluated by a standard "sleeping time" test (potentiation of an anaesthetic) in mice.

What is claimed is:

1. A phthaloylamido compound of the following general formula:

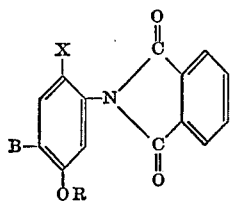

(I)

wherein X represents a chlorine or bromine atom, B represents a free carboxylic acid group or —$CO_2R_1$ wherein $R_1$ is a lower alkyl group, and R represents a hydrogen atom or a lower alkyl group.

2. A compound as claimed in claim 1, wherein B represents —$CO_2R_1$ wherein $R_1$ is a lower alkyl group, and R represents a lower alkyl group.

3. A compound of the formula:

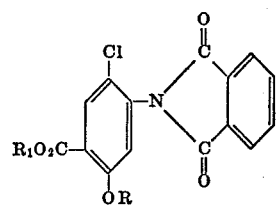

(Ia')

wherein each of R and $R_1$, which may be the same or different, in a lower alkyl group.

4. A compound as claimed in claim 3, wherein $R_1$ represents a methyl, ethyl, propyl or isopropyl group and R represents a methyl group.

5. Methyl-2-methoxy - 4 - phthaloylamido - 5 - chlorobenzoate.

6. Ethyl-2-methoxy - 4 - phthaloylamido - 5 - chlorobenzoate.

7. Isopropyl-2-methoxy - 4 - phthaloylamido-5-chlorobenzoate.

References Cited

Wagner et al., Synthetic Organic Chemistry, pp. 228, 229, 480, 568 (1953).

Noller, Chemistry of Organic Compounds (1965), pp. 526, 554.

JOSEPH A. NARCAVAGE, Primary Examiner

U.S. Cl. X.R.

260—471 R, 559 S; 424—274